Aug. 3, 1937. W. A. ABEGG 2,088,830
LINER MOUNTING FOR ROTARY TABLE BUSHINGS AND THE LIKE
Filed July 10, 1936
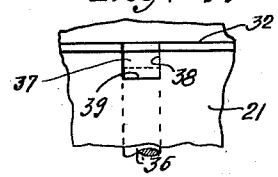
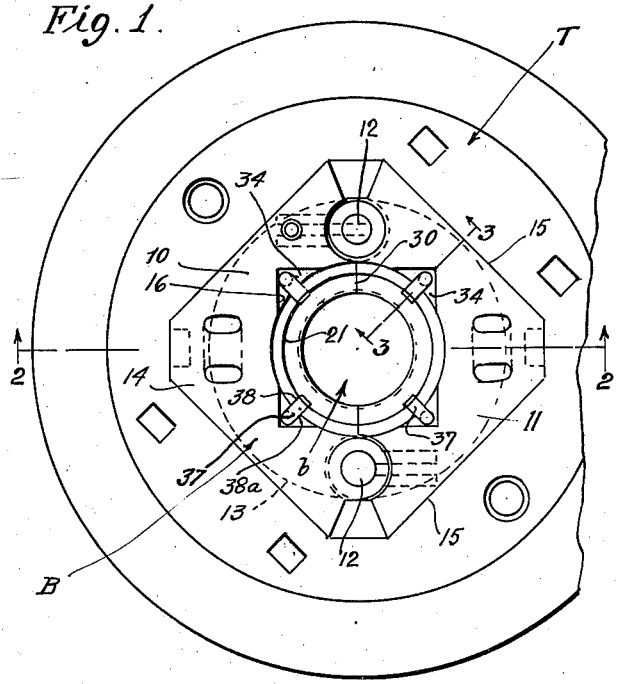
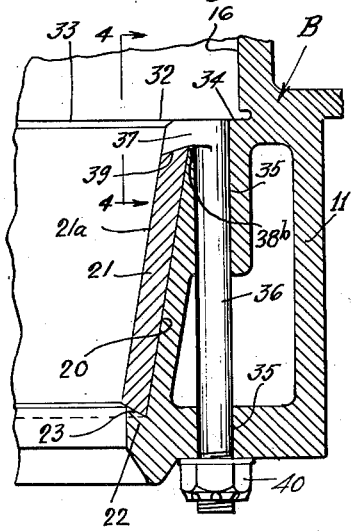
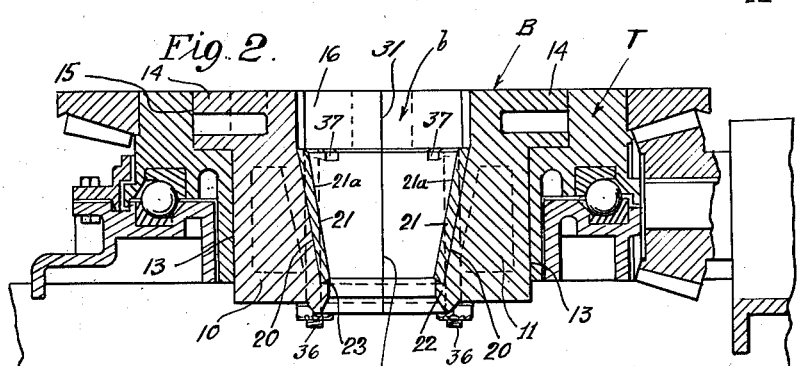
Inventor.
Walter A. Abegg.
Attorney.

Patented Aug. 3, 1937

2,088,830

UNITED STATES PATENT OFFICE 2,088,830

LINER MOUNTING FOR ROTARY TABLE BUSHINGS AND THE LIKE

Walter A. Abegg, Los Angeles, Calif., assignor of one-half to B. Reinhold, Los Angeles, Calif.

Application July 10, 1936, Serial No. 89,898

8 Claims. (Cl. 24—263)

This invention has reference to the provision and mounting of liners in pipe-supporting or engaging devices, such for instance as the bushing member or members of a rotary drilling table. Such a bushing, for the purposes of describing this invention, may be taken as typical of an annular member or assembly which surrounds a pipe and is adapted to take pipe-engaging and supporting slips. In such an annular member or assembly it is the object of this invention to provide wear-taking liners and an effective and simple mounting for them.

The invention will be best understood from the following detailed description of a preferred form of liner and mounting applied to the table bushing of a rotary drilling table. Such preferred and illustrative form and application are shown in the accompanying drawing in which, Fig. 1 is a plan showing a table bushing equipped with liners illustrative of my invention;

Fig. 2 is a section taken on line 2—2 of Fig. 1;

Fig. 3 is an enlarged fragmentary section taken on line 3—3 of Fig. 1;

Fig. 4 is a fragmentary view taken in line 4—4 of Fig. 3.

Fig. 5 is a fragmentary view of the central part of Fig. 2 but showing additionally wedge slips about a pipe in the central bore; and Fig. 6 is a fragmentary view of the central part of Fig. 1, but showing additionally a "kelly" bushing in the central bore.

In the drawing T represents a typical rotary table and B indicates as a whole a bushing assembly carried by the table and designed to take either a pipe rotating bushing or pipe-engaging slips, in manners well known in the art. The particular form, construction and assembly of the bushing B here shown is that which forms the subject-matter of my Patent No. 2,068,218, issued January 19, 1937, entitled Rotary table bushing. However, the details of design, structure and assembly of this rotary table bushing have no part in the present invention except as hereinafter indicated. The bushing as here shown is comprised of two halves 10 and 11, interconnected by two pins 12 to form an annular bushing assembly. This annular bushing assembly has a lower part which fits into a cylindric bore 13 of the table T, and has a square head flange 14 which fits into the correspondingly squared opening 15 in the upper part of the table; this squared arrangement providing the means whereby rotation is transmitted from the table to the bushing.

Internally, this bushing B has a vertical bore, designated generally by the letter $b$, which bore is adapted to take the usual rotary "kelly" bushings K (Fig. 6), or to take the usual pipe-engaging and supporting slips W (Fig. 5). For the purpose of taking and to drivingly engage the rotary "kelly" bushings, the upper part of the bore $b$ is squared out, as indicated at 16. And for the purpose of taking the pipe-engaging and supporting slips W which fit about pipe P the lower part of bore $b$ is conical and tapered downwardly. It is particularly with this downwardly tapered part of bore $b$ that the present invention is concerned. As indicated before, the bushing structure as so far described, may be taken as typical of any annular pipe surrounding member or assembly adapted to take slips for pipe engagement and support.

For the purpose of applying my present invention to the structure thus far described, I provide the bushing B with a tapered bore 20 having a diameter somewhat larger than the tapered bore otherwise would be, in order to accommodate the thickness of the liner or liner sections 21 with which I face the tapered bore. I provide bushing B, at or near the lower end of the tapered bore, with an annular liner supporting ledge 22. In this particular case this annular ledge is made up of two half annuli, due to the separation of bushing B into two parts. The upwardly facing shoulder surface 23 of this supporting ledge 22 is inclined downwardly and outwardly as is most clearly shown in Fig. 3; so that the correspondingly shaped lower end of liner 21 tends to be forced outwardly and downwardly into the seat provided at 23 when a vertical load force is imposed upon the liner. The liner is so designed and proportioned that, when its lower end seats firmly at 23 on the supporting ledge 22, its outer conical surface fits snugly against the tapered bore surface 20 of the bushing B; so that, when the liner is put under heavy load and correspondingly heavy spreading forces from the wedge slips W within it, the liner cannot expand except by the very slight amount necessary for its firm outward seating against conical bore 20, and the very slight amount by which the bushing B itself will expand radially under such forces. The liner 21 has an inner tapered or conical face 21$a$ to take the usual pipe-supporting slips W.

As shown here, in its application to the particular type of bushing illustrated, the liner 21 is formed in two halves, divided at the plane indicated by the numeral 30, coincident with the division plane 31 dividing the two halves 10 and 11 of bushing B. And the upper end 32 of the liner is arranged to be substantially flush with the upper end of the conical bore 20 in bushing B and with the plane 33 (see Fig. 3) of the surfaces 34 (see Fig. 1) which define the bottoms of the squared portions 15 of the bushing bore.

The purpose of the liner being to take the wear of the slips off the bushing, the liner is made of material suitable to that purpose; typically a hard and tough metal. However, even though the liner be made of no better material than the bushing, its easy and inexpensive replaceability saves the much more expensive bushing.

In this particular application of the liner I employ four hold-down bolts located so that they lie in alinement with the four squared out portions 16 of the bushing bore. Thus, at each of these portions of the bushing there is a bolt accommodating bore 35 which extends through the table from the surface 34 to the bottom of the bushing; and in each of these bores a long bolt or rod 36 is mounted. Each bolt has an overhanging head 37 of a configuration best understood from Figs. 1 and 3. This head or transverse extension 37 overhangs the bolt at one side only, projecting inwardly through a notch 38a in the bushing and into a notch 38 in the upper edge of liner 21. The head has an angled or hooked lower surface which seats upon the inclined surface 39 which forms the bottom of the notch in the liner and may be considered as an upwardly facing shoulder near the upper end of the liner. This surface 39 (the bottom of the notch 38 and the lower surface of bolt head 37) is inclined inwardly and downwardly, so that downward tension on the bolt head tends to draw the liner downwardly, and outwardly against the bushing surface 20.

The angle between the diagonal surface 23 at the lower end of the liner, and the conical bore surface 20 of the bushing, is preferably acute; so that downward thrust on the liner along surface 20 will, by the angularity of 23, tend to seat the liner firmly back against surface 20. Preferably also surface 39 makes an acute angle with surface 20.

It may be noted that bushing bore 20 need not necessarily be parallel to the conical interior surface 21a of the liner; and that thus the bore 20 need not necessarily be conical, but could be either conical of greater or less taper than 21a, or could even be cylindric. It is preferable however that 21a and 20 be parallel and that the liner be of uniform thickness.

Each bolt 36 is equipped with a threaded nut 40 at its lower end bearing upwardly against the under face of bushing B. By setting the nut 40 up with sufficient force the bolt 36 is put under longitudinal stress and is stretched. The elastic stretch that can thus be put upon the bolt, of the proportionate length illustrated, is equal to or greater than the vertical or longitudinal compression to which liner 21 is subjected when it is put under any usual load. The total load placed upon the liner may be substantially greater than the total tensile strains that are initially placed upon the four liner holding bolts; but the total cross sectional area of the liner is substantially greater than that of the bolts. The result is that the bolt heads 37 will always follow the upper edge of the liner down as it moves down under load (the bottoms of bushing notches 38b being spaced sufficiently below the under faces of associated heads 37 to allow this movement), and that the bolts and bolt heads will always act to hold the liner rigidly and tightly in place.

The bolt heads also act to lock the liner against rotation within the bushing. The bolts 36 being snugly fitted into bores 35, and the bolt heads 37 being snugly fitted into liner notches 38, lock the liner against relative rotation. Thus this locking arrangement prevents the liner from slipping rotatively when rotation is applied to a pipe held in slips in the liner; and it prevents a multiple part liner from moving out of proper register with the parts of the bushing or other member the liner is mounted in. For instance, the bushing shown here is one that can be opened up by removing one pin 12 and using the other as a hinge. By the liner locking arrangement the liner parts are always held so that their plane of separation 30 is always matched with the separating plane 31 of the bushing, thus facilitating opening and closing.

I claim:

1. In combination, an annular pipe supporting member having a vertical liner receiving bore and having a liner supporting ledge projecting into the lower part of the bore, a vertically extending liner element fitting said bore and presenting an inner slips contacting face, said liner element resting at its lower end on said supporting ledge, and liner retaining means embodying a bolt extending vertically through the annular member, having a head on its upper end overhanging an upwardly facing shoulder on the liner element near its upper end, and means at the lower end of the bolt to draw the bolt down to engage its head with the liner and to tension the bolt.

2. In combination, an annular pipe supporting member having a downwardly tapering liner receiving bore and having a liner supporting ledge projecting into the lower part of the bore, the ledge having an upper surface sloping downwardly and outwardly, a vertically extending liner element fitting said bore and presenting an inner tapered slips contacting face, said element having a lower end surface fitting and resting on the upper inclined surface of the supporting ledge, and liner retaining means embodying a bolt extending vertically through the annular member, having a head on its upper end overhanging an upwardly facing shoulder on the liner element near its upper end, and means at the lower end of the bolt to draw the bolt down to engage its head with the liner and to tension the bolt.

3. In combination, an annular pipe supporting member having a vertical liner receiving bore and having a liner supporting ledge projecting into the lower part of the bore, a vertically extending liner element fitting said bore and presenting an inner slips contacting face, said liner element resting at its lower end on said supporting ledge, said member having a bolt receiving bore extending through it vertically outside of but close to the liner receiving bore, and the liner having a notch in its upper edge adjacent the bolt bore, and liner retaining means embodying a bolt extending vertically through the bolt bore, having a head on its upper end extending transversely into the liner notch, and means at the lower end of the bolt to draw the bolt down to engage its head with the liner and to tension the bolt.

4. In combination, an annular pipe supporting member having a downwardly tapering liner receiving bore and having a liner supporting ledge projecting into the lower part of the bore, the ledge having an upper surface sloping downwardly and outwardly, a vertically extending liner element fitting said bore and presenting an inner tapered slips contacting face, said element having a lower end surface fitting and resting on the upper inclined surface of the supporting ledge, said member having a bolt receiving bore extending through it vertically outside of but close to the liner receiving bore, and the liner having a notch in its upper edge adjacent the bolt bore, and liner retaining means embodying a bolt extending vertically through the bolt bore, having a head on its upper end extending transversely into the liner notch, and means at the lower end of the bolt to draw the bolt down to engage its head with the liner and to tension the bolt.

5. In combination, an annular pipe supporting member having a downwardly tapering liner receiving bore and having a liner supporting ledge projecting into the lower part of the bore, the ledge having an upper surface sloping downwardly and outwardly, a vertically extending liner element fitting said bore and presenting an inner tapered slips contacting face, said element having a lower end surface fitting and resting on the upper inclined surface of the supporting ledge, said member having a bolt receiving bore extending through it vertically outside of but close to the liner receiving bore, and the liner having a notch in its upper edge adjacent the bolt bore, and liner retaining means embodying a bolt extending vertically through the bolt bore, having a head on its upper end extending transversely into the liner notch, and means at the lower end of the bolt to draw the bolt down to engage its head with the liner and to tension the bolt; the upper inclined surface of the liner supporting ledge, and the liner engaging surface of the bolt head, each making an acute angle with the tapered surface of the defining wall of the slips receiving bore.

6. In combination, an annular bushing member having in its lower portion a downwardly tapering circular liner receiving bore, having in its upper portion a squared opening of diagonal dimension larger than the upper end diameter of the liner receiving bore, and having an annular liner supporting ledge projecting into the lower part of the tapered liner receiving bore, the ledge having an upper liner supporting surface sloping downwardly and outwardly, a tapered liner element exteriorly fitting said tapered bore and presenting an inner tapered slips contacting face, said liner element having a lower end surface fitting and resting on the upper inclined surface of the supporting ledge, the bushing member having bolt receiving bores extending downwardly through it from the bottom defining surfaces of its squared opening and located close to the tapered bore, the liner having notches in its upper end adjacent the bolt bores, and liner retaining means embodying bolts extending vertically through the bolt bores, having heads on their upper ends extending transversely into the liner notches and bearing down on the liner, and means at the lower ends of the bolts to draw the bolts down to press the liner down and to tension the bolts.

7. In combination, an annular pipe supporting member having a vertical liner receiving bore, a vertically extending liner element fitting said bore, means on the member engaging the liner element near its lower end to hold said lower end against downward movement with respect to the member, and liner retaining means embodying a rod supported in vertical position by the member, a transverse extension on said rod engaging the liner near its upper end and being vertically spaced above the underlying portion of the member, and means near the lower end of the rod coacting with the member to tension the rod and put the liner under vertical compression between the extension and said first mentioned means.

8. In combination, an annular pipe supporting member having a vertical liner receiving bore, a vertically extending liner element fitting said bore, means on the member engaging the liner element near its lower end to hold said lower end against downward movement with respect to the member, and liner retaining means embodying a rod supported in vertical position by the member, a transverse extension on said rod engaging the liner near its upper end and being vertically spaced above the underlying portion of the member, the surface of engagement between the transverse extension and the liner making an acute angle with the surface of the defining wall of said bore, and means near the lower end of the rod coacting with the member to tension the rod and put the liner under vertical compression between the extension and said first mentioned means.

WALTER A. ABEGG.